R. W. WIEDERWAX.
APPARATUS FOR HEATING CASTINGS.
APPLICATION FILED FEB. 11, 1918.

1,275,638.

Patented Aug. 13, 1918.
3 SHEETS—SHEET 1.

Inventor
R. W. Wiederwax
By C. H. Parker
Attorney

R. W. WIEDERWAX.
APPARATUS FOR HEATING CASTINGS.
APPLICATION FILED FEB. 11, 1918.

1,275,638.

Patented Aug. 13, 1918.
3 SHEETS—SHEET 2.

Inventor
R.W. Wiederwax

By C. L. Parker
Attorney

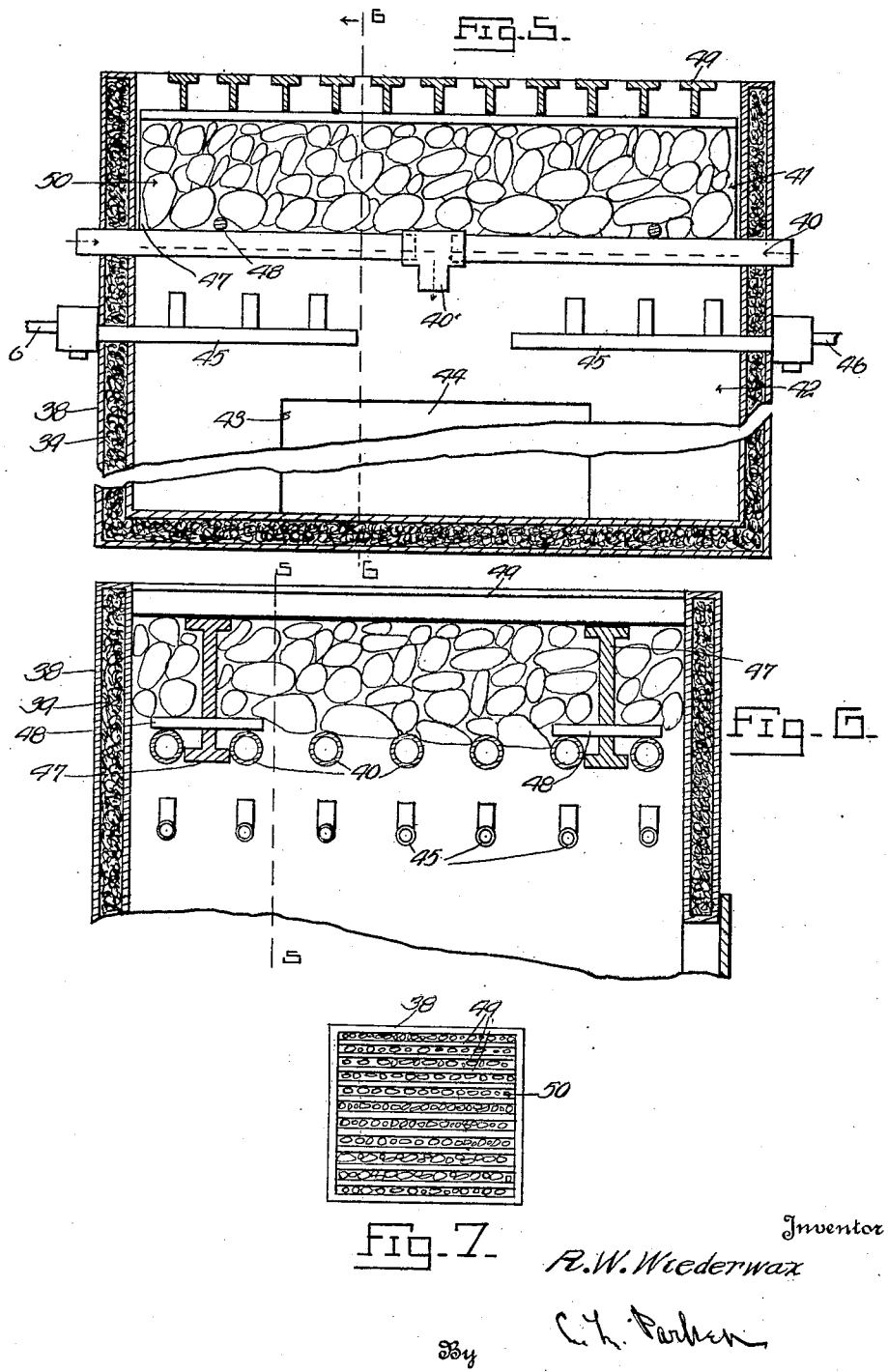

UNITED STATES PATENT OFFICE.

ROBERT W. WIEDERWAX, OF ATLANTIC CITY, NEW JERSEY, ASSIGNOR OF ONE-HALF TO CARLTON GEIST, OF ATLANTIC CITY, NEW JERSEY.

APPARATUS FOR HEATING CASTINGS.

1,275,638. Specification of Letters Patent. Patented Aug. 13, 1918.

Application filed February 11, 1918. Serial No. 216,659.

*To all whom it may concern:*

Be it known that I, ROBERT W. WIEDERWAX, a citizen of the United States, residing at Atlantic City, in the county of Atlantic and State of New Jersey, have invented certain new and useful Improvements in Apparatus for Heating Castings, of which the following is a specification.

My invention relates to apparatus for heating castings or the like, to be welded, in a manner to prevent distorting or cracking of the same.

An important object of the invention is to provide apparatus of the above mentioned character, having means to gradually and evenly heat the castings, prior to welding, and to gradually and evenly cool the same, after the welding operation, such apparatus being adapted to be operated with gaseous fuel, while not necessarily restricted to the use of this particular kind of fuel.

Other objects and advantages of the invention will be apparent during the course of the following description.

Figure 1:
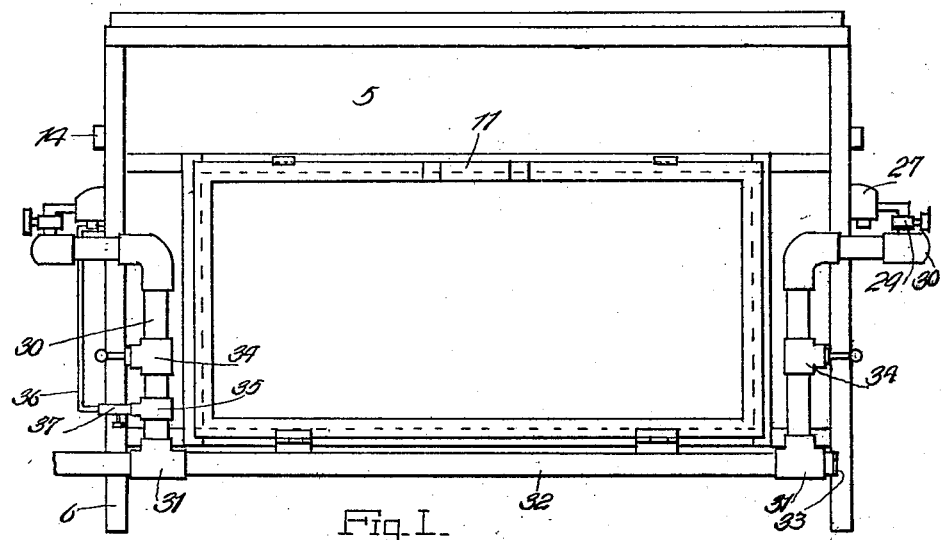
Figure 2:
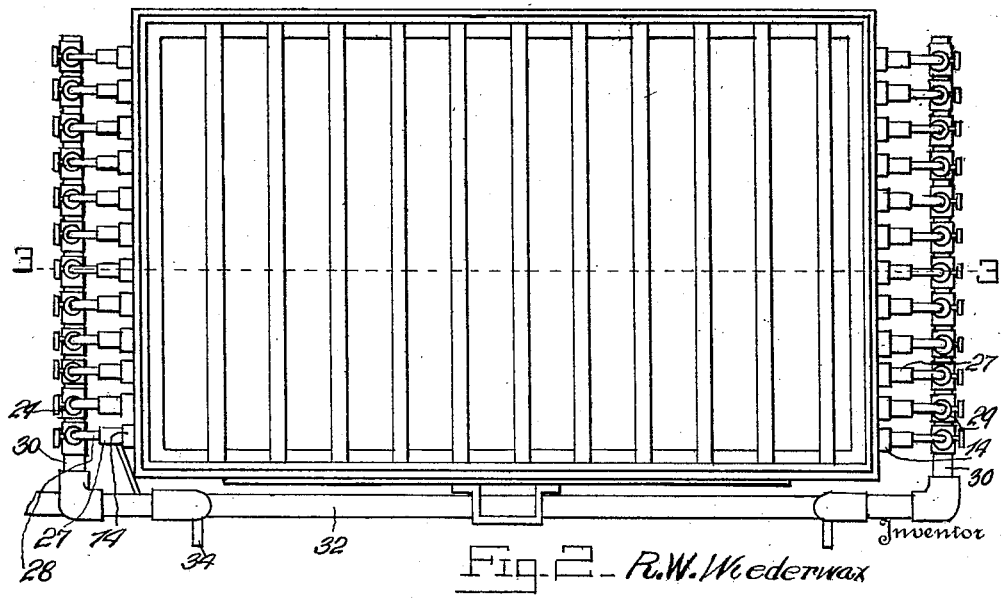
Figure 3:
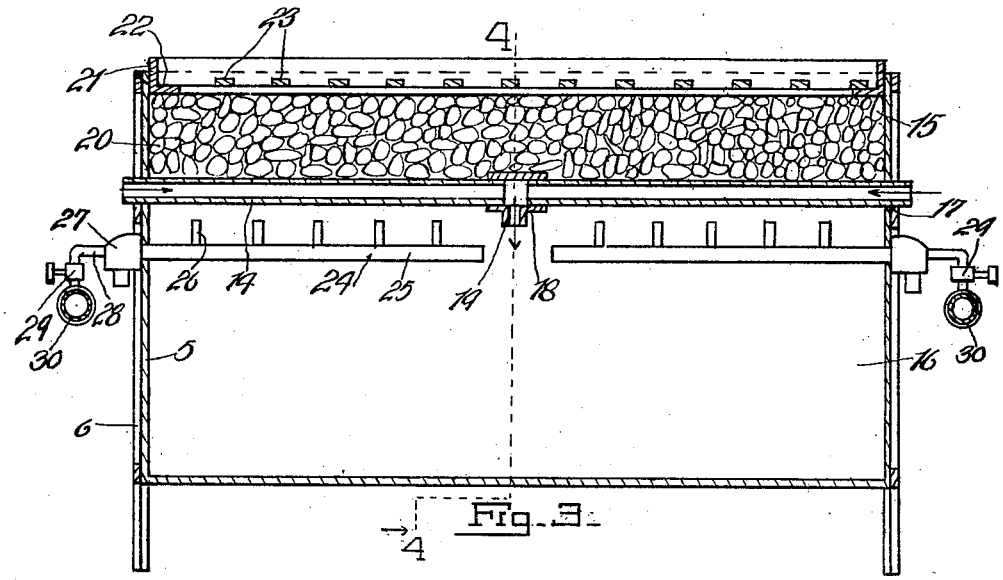
Figure 4:
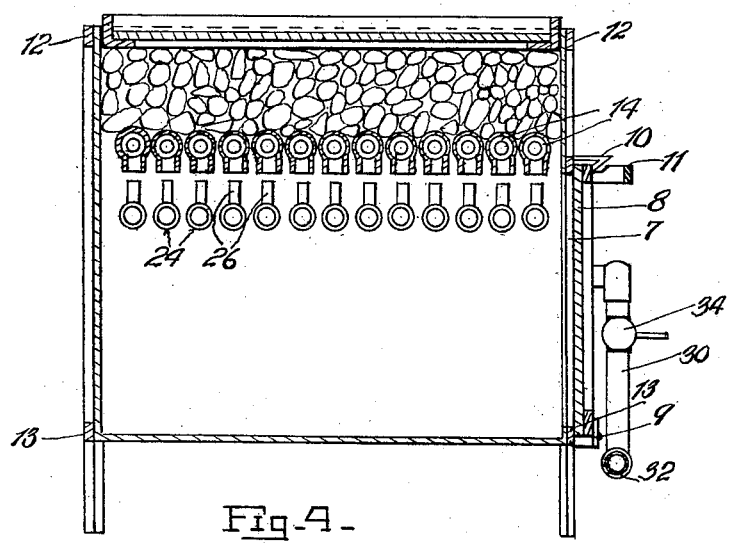

In the accompanying drawings forming a part of this specification and in which like numerals are employed to designate like parts throughout the same, Figure 1 is a side elevation of apparatus embodying my invention, Fig. 2 is a plan view of the same, Fig. 3 is a vertical longitudinal sectional view taken on line 3—3 of Fig. 2, Fig. 4 is a transverse sectional view taken on line 4—4 of Fig. 3, Fig. 5 is a longitudinal section through a modified form of heater embodying the invention, taken on line 5—5 of Fig. 6, Fig. 6 is a transverse section taken on line 6—6 of Fig. 5, and, Fig. 7 is a diagrammatic plan view of the apparatus.

In the drawings, wherein for the purpose of illustration is shown a preferred embodiment of my invention, the numeral 5 designates a main casing, having legs 6 secured to the same, at its corners, and depending therefrom, as shown. One side of the casing is provided with a door opening 7, adapted to be covered by a vertically swinging door 8, hinged at its lower edge, as shown at 9. The door is held closed by spring catches 10, but any other suitable means may be employed, for this purpose. The door is equipped near its upper edge with a handle 11, as shown. The casing 5 is preferably reinforced at its top and bottom by strips 12 and 13.

The numeral 14 designates horizontal combined support and air supply pipes or conduits, arranged within the upper portion thereof, providing an upper chamber 15, and a lower chamber 16, in the casing 5. The outer ends of the pipes 14 extend through openings 17 in the ends of the casing 5, and these pipes are arranged in more or less close relation, as indicated in Figs. 2 and 4. The inner ends of each pair of pipes 14 project into the opposite ends of a T-coupling 18, having a downwardly discharging outlet 19, as shown. Air is drawn in through the pipes 14, as indicated by the arrows, and discharges downwardly through the outlets 19, into the chamber 16.

The upper chamber 15 is more or less filled with aggregates 20 of refractory material, preferably formed of silica. These mineral aggregates are supported by the pipes 14, as shown.

Arranged within the upper end of the chamber 15 and disposed upon the top of the mass of mineral aggregates 20, is an open frame 21, formed of iron or the like, with its material L-shaped in cross-section, affording a supporting flange 22. Arranged upon the supporting flange 22 are metallic, preferably iron, spacing bars or elements 23, to receive the castings thereon and retain the same spaced from the mineral aggregates 20, thereby preventing fusing.

Disposed within the chamber 16, near and beneath the pipes 14, are gas burners 24, of the Bunsen type. These burners comprise horizontal body portions 25, carrying vertical tips 26. The burners further comprise shells 27, connected with the tubular body portions 25, to properly mix air and gas and to supply such mixture to the tubular body portions 25, as is well known. Connected with the shells 27 are pipes 28, having cut-off valves 29 connected therein. The pipes 28 are connected with pipes 30, connected by means of T-couplings 31, with a gas supply pipe 32. One end of this gas supply pipe is closed or plugged, as shown at 33, while its opposite end is connected with a source of gas. Cut-off valves 34 are also connected in the pipes 30.

One pipe 30 has a T-coupling 35 connected therein, and having connection with a pipe 36 of a pilot light, the pipe 36 extending into the upper portion of the chamber 16, in proximity to the burners 24. The pipe 36 has a cut-off valve 37 connected therein, as shown.

In the operation of the apparatus, the castings or the like to be heated, prior to welding, are placed upon the spacing bars 23, and held thereby in proximity to, but out of contact with the mineral aggregates 20. The burners 24 are now lighted and serve to heat the mass 20, which in turn imparts its heat to the castings, in a gradual and even manner, thereby properly heating the same to prevent cracking or distorting of such castings. When the castings are heated to the proper degree, the welding operation may be effected by the ordinary acetylene welding torch, while the castings are supported by the bars 23. During this welding operation, the burners 24 may be operated, or they may be turned off, if desired.

After the welding operation has been completed, it is necessary that the castings be cooled gradually, to prevent cracking or distorting of the same, and to accomplish this, such castings are placed within the chamber 16, and are thereby subjected to the heat radiating from the mass 20, which gradually cools when the burners are turned off.

During the operation of the burners, they consume the oxygen within the chamber 16, thereby creating a partial vacuum within this chamber. This vacuum draws or sucks in air through the pipes 14, as indicated by the arrows. The pipes 14 being arranged above the burners, the incoming air is heated prior to its discharge in proximity to the tips 26.

In Figs. 5 to 7 inclusive, I have shown a different form of heating apparatus embodying my invention. This apparatus comprises a shell or casing 38, which is preferably double walled and hollow for the reception of asbestos 39, or other heat insulating material. Horizontal air inlet pipes 40 extend longitudinally within the casing 38, and divide the same into upper and lower chambers 41 and 42. The inner ends of the pipes 40 are spaced and connected by T-couplings 40', discharging downwardly into the chamber 42, as shown. The lower chamber 42 is normally substantially closed and is provided with a door opening 43, adapted to be covered by a door 44.

Disposed within the lower chamber 42 are gas burners 45, preferably identical with the gas burners 24. These gas burners receive gas from pipes 46, and the supply of gas may be controlled by any suitable means.

Disposed within the upper chamber 41 are preferably longitudinally extending eye-beams 47, the lower ends of which project between certain of the pipes 45. The eye-beams 47 are provided near their lower edges with transverse openings for the reception of transverse supporting pins 48, arranged upon the top of certain of the pipes 40, and supported thereby. Disposed upon the top of the eye-beams 47 and secured thereto by any suitable means are T-bars 49, adapted to support the castings or the like to be heated, prior to welding and retain the same spaced a suitable distance from a filling 50 of refractory material, such as silica, thereby preventing fusing.

The operation of the second form of the invention is so similar to that of the first that it is thought to be unnecessary to state the same.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. In apparatus of the character described, a casing having an upper chamber and a substantially closed lower chamber, a filling of refractory material arranged within the upper chamber, approximately horizontal pipes arranged within the top of the lower chamber to supply air therein and serving to support said filling, a plurality of burners arranged within the lower chamber beneath the pipes, and spacing bars arranged above and in proximity to the filling.

2. In apparatus of the character described, a casing having an upper chamber and a substantially closed lower chamber, a filling of refractory material arranged within the upper chamber, an open frame disposed within the upper chamber, spacing bars supported by the open frame, approximately horizontal pipes arranged within the top of the lower chamber to supply air therein and serving to support said filling, a plurality of burners arranged within the lower chamber beneath the pipes, and means to supply a fluid fuel to the burners.

3. In apparatus of the character described, a casing, a set of approximately horizontal pipes arranged within the upper portion of the casing and separating the same into upper and lower chambers with the outer ends of the pipes passing through openings in the wall of the casing, couplings connecting the inner ends of corresponding pipes and having outlet openings, a filling of refractory aggregates arranged within the upper chamber and supported by the pipes, metallic spacing means disposed at the top of the filling, and gas burners arranged in the upper portion of the lower chamber near and beneath the pipes.

4. In apparatus of the character described, a casing, having upper and lower chambers and a door opening leading into the lower chamber, a door to cover the door opening, a plurality of horizontal pipes arranged at the top of the lower chamber with their outer ends extending through openings in the wall of the casing and having outlet openings formed therein between the ends thereof for discharging air into the lower chamber, a filling of refractory aggregates arranged within the upper chamber and supported by the pipes, a plurality of gas burners arranged within the lower chamber near and beneath the pipes, and means to supply gas to the burners.

5. In apparatus of the character described, a casing, substantially horizontal air supply pipes arranged therein and dividing the casing into upper and lower chambers, beams having means to engage with the pipes and be supported thereby, spacing bars arranged upon the tops of the beams, a filling of refractory material disposed within the upper chamber, and gas burners arranged within the lower chamber beneath said filling.

6. In apparatus of the character described, a casing, horizontal air supply pipes arranged therein and dividing the casing into upper and lower chambers and having outlet openings disposed between the ends of the pipes, beams arranged within the upper chamber, transverse elements carried by the beams and disposed upon the tops of the pipes, spacing bars disposed upon the top of the beams and secured thereto, a filling of refractory material arranged within the upper chamber, and gas burners disposed within the lower chamber beneath said filling.

In testimony whereof I affix my signature in presence of two witnesses.

ROBERT W. WIEDERWAX.

Witnesses:
THEO. W. SCHIMPF,
EMMA H. YARD.

Copies of this patent may be obtained for five cents each, by addressing the "Commissioner of Patents, Washington, D. C."